Patented Oct. 15, 1940

2,218,181

UNITED STATES PATENT OFFICE 2,218,181

PEST CONTROL

Norman E. Searle and Wendell H. Tisdale, Wilmington, Del., assignors to E. I. du Pont de Nemours & Company, Wilmington, Del., a corporation of Delaware No Drawing. Application June 15, 1939, Serial No. 279,260

14 Claims. (Cl. 167—22)

This invention relates to pest control, more particularly to compositions for control of fungi, bacteria, and insects, and still more particularly to micro-organism devitalizing compositions containing as an essential ingredient an ester of a butenedioic acid. In its principal embodiment, the invention is concerned with the disinfecting and preservation of plant and animal matter, whether in the natural or fabricated state, with certain esters of maleic or fumaric acid.

We have found that esters of butenedioic acids with aliphatic (including cycloaliphatic) monohydric alcohols, particularly those having no more than three carbon atoms, provide a new and effective means for controlling economically harmful lower forms of life, such as insects and micro-organisms (bacteria and fungi) which prey on living and non-living organic matter, whether in its natural or fabricated state. In particular, they function excellently as preservatives in materials such as glue, casein products, and mucilaginous pastes. These esters comprise both the acid and neutral esters, the ones giving the outstanding results being the lower monohydric alcohol esters, particularly the methyl, ethyl and β-methoxyethyl and allyl esters. By "lower alcohol" we mean, as just indicated, an alcohol having no more than three carbon atoms.

It is well known that the butenedioic acids and their derivatives comprise two series of compounds which bear to one another the relationship of geometric isomers, and which differ markedly in many of their chemical and physical properties. Thus, for example, the two geometric modifications of the dimethyl ester of butene-1,4-dioic acid have quite different saponification rates, melting points, boiling points, solubilities, heats of combustion, dipole moments, densities, molecular refractions, absorption spectra, Raman spectra, parachors, and the like. On account of the space relation of the terminal functional groups, these isomers are commonly referred to as cis-trans isomers, and, in the case of the butene-1,4-dioic acids, the cis form is known as maleic acid, and the trans form as fumaric acid. Due to the tetrahedral structure of the carbon atom, the overall configuration is planar, and the two forms may be represented fairly accurately by the structural formulae:

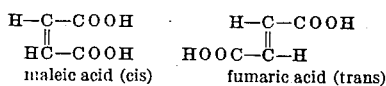

maleic acid (cis)    fumaric acid (trans)

This nomenclature also applies to the esters of these acids.

As already indicated, the esters employed in our invention may be either the mono or the diesters. The latter, that is, the neutral esters, may be simple or mixed, as for example dimethyl fumarate or ethyl methyl fumarate. The mono- esters may be the acid esters or derivatives thereof, such as ester amides and the like. In other words, the ionizable hydrogen or the hydroxyl group of the acid ester may be replaced to form salts, amides and the like.

The esters employed in our invention, and mentioned above, may be prepared by well known esterification techniques from the alcohol and the acid or acid anhydride. Thus, the trans esters may be prepared simply by reacting the alcohol with the cis acid anhydride. For example, dimethyl fumarate may be prepared in practically quantitative yield from maleic anhydride by gradually adding the latter to twice its weight of methanol containing 5% (by weight) of dry hydrogen chloride, and, when the initial evolution of heat subsides, refluxing the solution for about 12 hours. Upon cooling, the dimethyl fumarate separates as practically pure crystals which may be recrystallized from alcohol if desired. The cis esters may be prepared in a like manner if the hydrogen chloride is replaced by sulfuric acid or para-toluenesulfonic acid. The cis form may be converted to the trans form by the addition of a small amount of a suitable catalyst such as piperidine. By similar well known esterification methods, various neutral and acid esters may be prepared, depending upon the choice and proportion of alcohol and the particular conditions under which the esterification is effected. Any aliphatic monohydric alcohol can be used. The alcohol can be open chain aliphatic or cycloaliphatic, and saturated or unsaturated. It is preferably, but not necessarily an unsubstituted alcohol. The acid can be any butenedioic acid, though butene-1,4-dioic acids are preferred.

As showing the wide diversity of compounds which may be used for the purposes of my invention, the following may be mentioned: diethyl maleate, dimethyl fumarate, methyl acid fumarate, diisopropyl fumarate, di-(β-methoxyethyl) fumarate, di-n-butyl maleate, the amide of monomethyl maleate, ethyl acid maleate, methyl isopropyl fumarate, diethyl α-chlorofumarate, di-n-octyl fumarate, cyclohexyl acid fumarate, dicyclopentyl maleate, di-(β-hydroxyethyl) fumarate, sodium propyl maleate, di(2-ethylhexyl) fumarate, di-n-dodecyl maleate, mono-9-octadecenyl maleate, dimethallyl fumarate, dimethyl citraconate, diethyl mesaconate, and dimethyl pyrocinchonate.

Of the above, the neutral esters of acids of the formula HOOC—CH=CH—COOH (i. e., maleic and fumaric acids) with alcohols of not more than three carbons are the more generally effective. The fumarates, and in particular dimethyl fumarate, are of especial interest.

The preservative agents of this invention have been found effective against such diverse organisms as Fomes annosus, Ceratostomella pilifera,

*Penicillium digitatum*, mixed lumber molds, *Aspergillus niger*, *Penicillium expansum* and common water-borne forms of the *Bacillus mesentericus* type, and are especially useful in preventing bacterial and fungal putrefaction of proteins. For example, a 20% animal glue solution containing 0.05% dimethyl fumarate or dimethyl maleate is effectively prevented from decomposition when inoculated with a mixture of leather bacteria and molds. Likewise, dry casein powder containing 0.5% (figured on the dry weight) of dimethyl fumarate is effectively preserved against air-borne and proteolytic bacteria under conditions in which such effective fungicides as sodium pentachlorophenolate and salicylanilide fail completely within eighteen days.

The agents of this invention accordingly may be used as preservatives for such substances as rawhide, glue, gelatin, starch pastes, leather, cellulosic substances, casein products, and other natural or manufactured products that are subject to attack or decomposition by various bacteria and molds. They are especially adapted to the preservation of aqueous systems containing nutrients for putrefactive organisms such as, for example, pickling solutions used for regenerated cellulose shrinkable caps. They may also be used for the preservation of plastics and paints, particularly casein paints. They may be used also for the control of fungous diseases on living plants and animals.

The agents of this invention, while especially effective for controlling micro-organisms, are also effective for controlling other types of pests; for example, di($\beta$-methoxyethyl) fumarate is a good mothicide and dibutyl maleate and the amide of monomethyl maleate are effective as contact insecticides.

In the applications of the compositions of our invention, it may be preferable or desirable to combine them with supplementary agents such as absorbent minerals, dispersing agents, sticking agents and the like. They may be applied in the form of dry dusts either with or without inert diluents, as solutions in organic solvents, or in the form of aqueous dispersions. They may be used alone or in combination with fungicides such as sulfur, cuprous oxide, thymol, etc., and may also be employed together with insecticides such as lead arsenate, phenothiazine, nicotine, and dodecyl thiocyanate and the like, whenever it may be desired to effect simultaneous control of bacterial putrefaction and insect infestation.

The terms "fungicide" and "insecticide", as used herein and in the appended claims, shall, except as otherwise qualified, be construed in accordance with the Insecticide Act of 1910, Section 6, and the regulations for its enforcement, regulations #14 and #15 (3rd revision August 28, 1928, U. S. Dept. Agriculture, Food and Drug Admin., S. R. A. I. F. No. 1, Oct. 1928). The term "pest-control" shall, except as otherwise qualified, be construed in accordance with U. S. Patent No. 2,165,030 granted July 4, 1939, on an application of Euclid W. Bousquet, Serial No. 143,730, filed May 20, 1937.

Since many apparently widely differing embodiments of my invention may be made it is to be understood that such variations as do not depart from the spirit and scope thereof are intended to be included within the appended claims.

We claim:

1. In the art of pest control, the method of immunizing organic matter from the attack of economically harmful organisms which comprises treating said materials with an aliphatic monohydric alcohol ester of a butenedioic acid.

2. In the art of pest control, the method of immunizing organic matter from the attack of economically harmful micro-organisms which comprises treating said materials with a butenedioic acid ester of an aliphatic monohydric alcohol having no more than 3 carbon atoms.

3. In the art of pest control, the method of immunizing organic matter from the attack of economically harmful micro-organisms which comprises treating said materials with a neutral butenedioic acid ester of an aliphatic monohydric alcohol having no more than 3 carbon atoms.

4. A pest-control composition useful as a fungicide and insecticide containing as an essential active ingredient an aliphatic monohydric alcohol ester of a butenedioic acid.

5. A pest-control composition having micro-organism devitalizing properties containing as an essential active ingredient a butenedioic acid ester of an aliphatic monohydric alcohol having no more than 3 carbon atoms.

6. A pest-control composition having micro-organism devitalizing properties containing as an essential active ingredient a neutral butenedioic acid ester of an aliphatic monohydric alcohol having no more than 3 carbon atoms.

7. A preservative and disinfectant composition for immunizing organic matter against attack by economically harmful micro-organisms containing as an essential active ingredient an ester of an aliphatic monohydric alcohol and an acid of the formula HOOC—CH=CH—COOH.

8. A preservative and disinfectant composition for immunizing organic matter against attack by economically harmful micro-organisms containing as an essential active ingredient an ester of an aliphatic monohydric alcohol having no more than 3 carbon atoms and an acid of the formula HOOC—CH=CH—COOH.

9. A preservative and disinfectant composition for immunizing organic matter against attack by economically harmful micro-organisms containing as an essential active ingredient a neutral ester of an aliphatic monohydric alcohol having no more than 3 carbon atoms and an acid of the formula HOOC—CH=CH—COOH.

10. A pest-control composition containing as an essential active ingredient a neutral ester of an aliphatic monohydric alcohol and an acid of the formula HOOC—CH=CH—COOH.

11. A pest-control composition containing as an essential active ingredient an acid ester of an aliphatic monohydric alcohol and an acid of the formula HOOC—CH=CH—COOH.

12. A pest-control composition containing as an essential active ingredient an acid ester of an aliphatic monohydric alcohol having no more than 3 carbon atoms and an acid of the formula HOOC—CH=CH—COOH.

13. A pest-control composition containing as an essential active ingredient a mono-ester of an aliphatic monohydric alcohol and a butenedioic acid.

14. A pest-control composition containing as an essential active ingredient a di-ester of an aliphatic monohydric alcohol and a butenedioic acid.

NORMAN E. SEARLE.
WENDELL H. TISDALE.